United States Patent
Rico Alvarino et al.

(10) Patent No.: US 10,440,728 B2
(45) Date of Patent: Oct. 8, 2019

(54) TECHNIQUES FOR SCHEDULING UNICAST AND MULTICAST WIRELESS COMMUNICATIONS

(71) Applicant: QUALCOMM Incorporated, San Diego, CA (US)

(72) Inventors: Alberto Rico Alvarino, San Diego, CA (US); Peter Gaal, San Diego, CA (US); Wanshi Chen, San Diego, CA (US); Shimman Arvind Patel, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 15/624,980

(22) Filed: Jun. 16, 2017

(65) Prior Publication Data

US 2018/0092106 A1  Mar. 29, 2018

Related U.S. Application Data

(60) Provisional application No. 62/401,681, filed on Sep. 29, 2016.

(51) Int. Cl.
*H04W 72/12* (2009.01)
*H04W 72/00* (2009.01)

(52) U.S. Cl.
CPC ....... *H04W 72/121* (2013.01); *H04W 72/005* (2013.01); *H04W 72/1205* (2013.01); *H04W 72/1263* (2013.01)

(58) Field of Classification Search
None
See application file for complete search history.

(56) References Cited

U.S. PATENT DOCUMENTS

2012/0257562 A1  10/2012  Kim et al.
2013/0258935 A1*  10/2013  Zhang ................. H04W 72/005
                                                                  370/312

(Continued)

FOREIGN PATENT DOCUMENTS

CN  103 636 241 A  3/2014

OTHER PUBLICATIONS

International Search Report and Written Opinion—PCT/US2017/045044—ISA/EPO—dated Oct. 24, 2017 17 pages.

(Continued)

*Primary Examiner* — Saumit Shah
(74) *Attorney, Agent, or Firm* — Linda G. Gunderson; Arent Fox LLP

(57) ABSTRACT

Various aspects relate to determining whether one or more subframes are multicast-broadcast single-frequency network (MBSFN) subframes. A user equipment (UE) can receive, from a base station, a system information broadcast signal that includes an indication of one or more subframes as MBSFN subframes, and a subsequent system information broadcast signal that indicates at least scheduling information for a multicast control channel (MCCH) in at least a portion of the one or more subframes. The UE can determine, based at least in part on the indication or on the subsequent system information broadcast signal, a numerology for a physical multicast channel (PMCH) corresponding to the MCCH in at least the portion of the one or more subframes, and can process at least the portion of the one or more subframes based at least in part on the scheduling information or the numerology for the PMCH.

28 Claims, 6 Drawing Sheets

(56) References Cited

U.S. PATENT DOCUMENTS

2014/0153471 A1* 6/2014 Zhang ............... H04W 4/06
370/312
2017/0290014 A1* 10/2017 Kim .................. H04W 4/06

OTHER PUBLICATIONS

Session Chairman (Nokia): "Chairman's Notes of Agenda Item 7.2.6 on eMBMS Enhancements for LTE", 3GPP Draft; R1-168407 Session Notes RAN1_86-7.2.6 V003, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 28, 2016, XP051133313, Retrieved from the Internet: URL:http://www.3gpp.org/ftp/tsg_ran/WG1_RL1/TSGR1_86/Docs/ [retrieved on Aug. 28, 2016], 2 pages.

* cited by examiner

TECHNIQUES FOR SCHEDULING UNICAST AND MULTICAST WIRELESS COMMUNICATIONS

CLAIM OF PRIORITY UNDER 35 U.S.C. § 119

The present Application for Patent claims priority to Provisional Application No. 62/401,681, entitled "TECHNIQUES FOR SCHEDULING UNICAST AND MULTICAST WIRELESS COMMUNICATIONS" filed Sep. 29, 2016, which is assigned to the assignee hereof and hereby expressly incorporated by reference herein for all purposes.

BACKGROUND

Described herein are aspects generally related to communication systems, and more particularly, to scheduling multicast and unicast wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, further improvements in LTE technology may be desired. Preferably, these improvements should be applicable to other multi-access technologies and the telecommunication standards that employ these technologies.

In wireless communication systems employing LTE, evolved Node Bs (eNBs) can schedule resources for multicast communications, such as multimedia broadcast multicast service (MBMS) communications. eNBs can broadcast system information blocks (SIBs) that indicate various system information of parameters to be used in communicating with the eNB, which may include information regarding which subframes are configured for MBMS communications and which subframes may be used for unicast communications. Accordingly, user equipment (UE) served by the eNB can acquire the SIBs and determine the system information, including subframes configured for MBMS communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for determining whether one or more subframes are multicast-broadcast single-frequency network (MBSFN) subframes is provided. The method includes receiving, by a user equipment (UE) and from a base station, a system information broadcast signal that includes an indication of one or more subframes as MBSFN subframes. The method also includes receiving, by the UE and from the base station, a subsequent system information broadcast signal that indicates at least scheduling information for a multicast control channel (MCCH) in at least a portion of the one or more subframes. Further, the method includes determining, by the UE and based at least in part on at least one of the indication or the subsequent system information broadcast signal, a numerology for a physical multicast channel (PMCH) corresponding to the MCCH in at least the portion of the one or more subframes. The method additionally includes processing, by the UE, at least the portion of the one or more subframes based at least in part on at least one of the scheduling information or the numerology for the PMCH.

In another example, an apparatus for determining whether one or more subframes are MBSFN subframes is provided. The apparatus includes a transceiver for communicating one or more wireless signals via one or more antennas, a memory configured to store instructions, and one or more processors communicatively coupled with the transceiver and the memory. The one or more processors are configured to receive, from a base station, a system information broadcast signal that includes an indication of one or more subframes as MBSFN subframes; receive, from the base station, a subsequent system information broadcast signal that indicates at least scheduling information for a MCCH in at least a portion of the one or more subframes, determine, based at least in part on at least one of the indication or the subsequent system information broadcast signal, a numerology for a PMCH corresponding to the MCCH in at least the portion of the one or more subframes, and process at least the portion of the one or more subframes based at least in part on at least one of the scheduling information or the numerology for the PMCH.

In another example, a method for indicating whether one or more subframes are MBSFN subframes is provided. The method includes determining whether to generate one or more subframes as an MBSFN subframe having one of a legacy MBSFN format or a MBSFN format without a control region, and determining a numerology for a PMCH in the one or more subframes based at least in part on whether the one or more subframes are of the legacy MBSFN format or the MBSFN format without the control region. The method further includes transmitting, by a base station, one or more system information broadcast signals that indicate one of whether the one or more subframes are of the legacy MBSFN format or the MBSFN format without the control region, and/or the numerology for the PMCH in the one or more subframes.

In yet another example, an apparatus for indicating whether one or more subframes are MBSFN subframes is provided. The apparatus includes a transceiver for communicating one or more wireless signals via one or more antennas, a memory configured to store instructions, and one or more processors communicatively coupled with the transceiver and the memory. The one or more processors are configured to determine to generate one or more subframes as an MBSFN subframe having one of a legacy MBSFN format or a MBSFN format without a control region, determine a numerology for a PMCH in the one or more subframes based at least in part on whether the one or more subframes are of the legacy MBSFN format or the MBSFN format without the control region, and transmit one or more system information broadcast signals that indicate one of whether the one or more subframes are of the legacy MBSFN format or the MBSFN format without the control region, or the numerology for the PMCH in the one or more subframes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
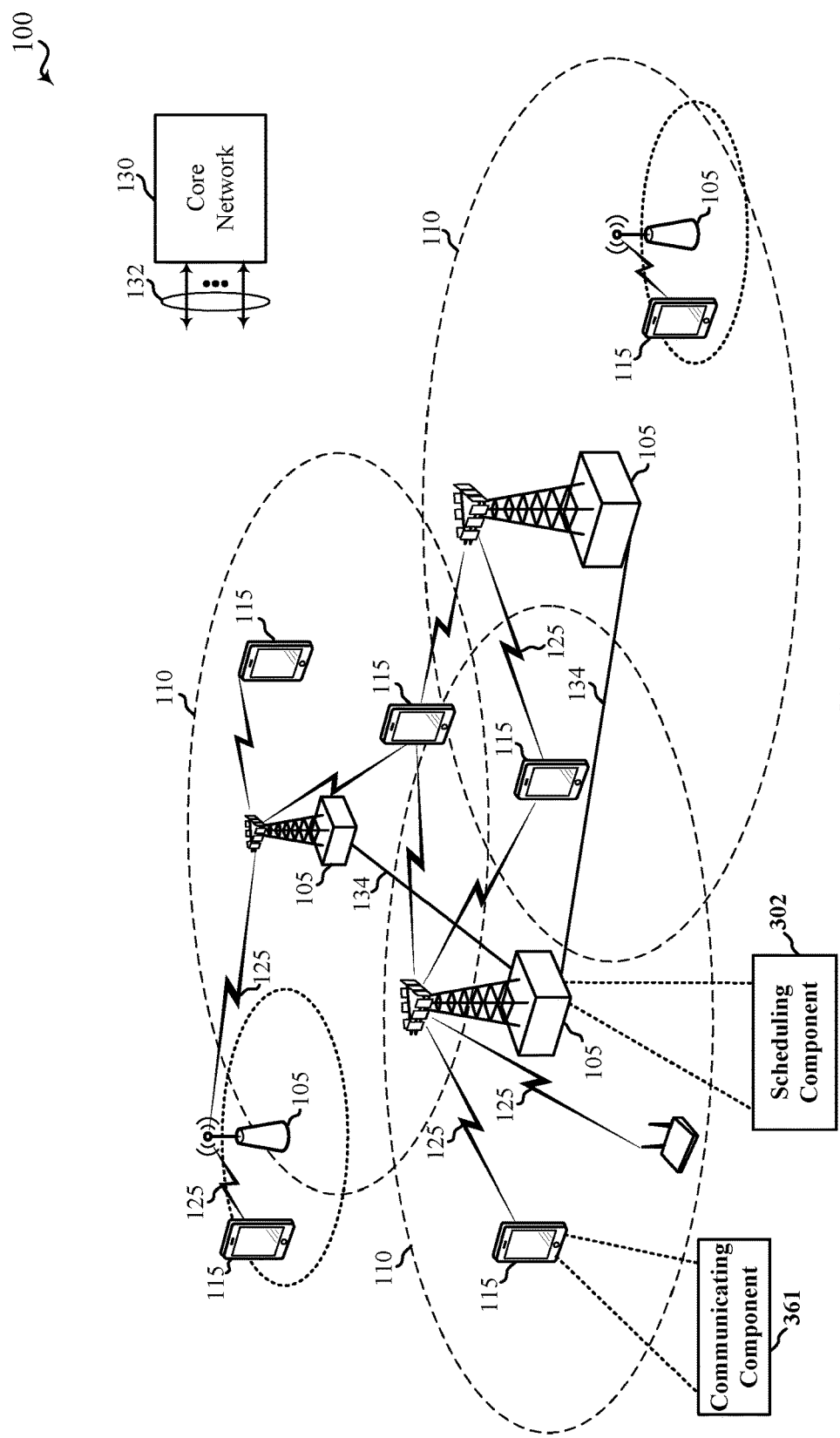
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to scheduling multicast communications to allow utilization of multiple associated numerologies and/or dynamic switching between multicast and unicast communications over a period of time. In an example, one or more broadcast signals including system information (e.g., broadcast signals with system information blocks (SIB)) can include an indication as to whether one or more transmission time intervals (TTI) or other time periods are associated with multicast communications and can also include scheduling information for the multicast communications. One of a plurality of possible numerologies for the multicast communications can be determined or derived from the indication or the scheduling information, and used along with the scheduling information to process the multicast communications. In another example, a type of subframe can be dynamically modified to a different type, and the different type can be determined based on scheduling information and/or numerology indicated in subsequent broadcast signals related to configuration of the multicast communications.

In a specific example, a base station can transmit one or more first broadcast signals with system information (e.g., SIBs) that include an indicator of whether one or more subframes are multicast-broadcast single-frequency network (MBSFN) subframes and one or more subsequent broadcast signals with system information (e.g., SIBs) that include scheduling information for the MBSFN subframes. In one example, the one or more first broadcast signals may include an indicator as to whether one or more subframes are of a normal (non-MBSFN) format, a legacy MBSFN format, or a different MBSFN format (e.g., a MBSFN format without a control region). The one or more subsequent broadcast signals may include scheduling information for the MBSFN communications (e.g., physical multicast channel (PMCH) information). In this example, a user equipment (UE) receiving the broadcast signals can determine the non-MBSFN, legacy MBSFN, or different MBSFN format for one or more subframes, the scheduling information, and can derive a numerology for multicast communications over the PMCH based on determining whether one or more MBSFN subframes are of the legacy MBSFN format or the different MBSFN format. The UE can accordingly process communications received over the PMCH in MBSFN subframes. In addition, the UE may determine whether the format of the subframe is overridden based on the scheduling information.

In another example, the one or more first broadcast signals may include an indicator as to whether the one or more subframes are of a normal (non-MBSFN) format or a legacy MBSFN format, and the one or more subsequent broadcast signals may include scheduling information for the PMCH that can also indicate the numerology of the PMCH. The UE receiving the broadcast signals can determine the MBSFN or non-MBSFN format for the one or more subframes, the scheduling information, the numerology, and can derive whether an MBSFN subframe is of the legacy format or a different format based at least in part on the indicated numerology. For example, the numerology can relate to one or more parameters that can be used in performing a fast Fourier transform (FFT) over the one or more subframes to decode data in the one or more subframes, such as a cyclic prefix (CP) value, a subcarrier spacing, etc.

Referring to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a scheduling component 302 configured to indicate one or more parameters related to multicast communications, and/or to transmit multicast communications based on the one or more parameters. Similarly, one or more of UEs 115 may include a communicating component 361 configured to obtain the one or more parameters related to multicast communications and/or process multicast communications received based on the one or more parameters. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In network communication systems using LTE/LTE-A communication technologies, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., Si interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. The techniques described herein may be used for either synchronous or asynchronous operations.

The UEs 115 are located throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization. Each of the different operating modes that may be employed by wireless communications system 100 may operate according to frequency division duplexing (FDD) or time division duplexing (TDD).

In a specific example, an access point 105 may configure multicast (e.g., MBSFN) communications with one or more UEs 115. For example, the MBSFN communications may be related to multimedia broadcast multicast service (MBMS) communications for broadcasting multimedia data to the one or more UEs 115. In LTE, the access point 105 can indicate, in system information, which subframes in a radio frame are MBSFN subframes, and the UE 115 can accordingly determine the MBSFN subframes and receive the MBMS communications for providing a multimedia service at the UE 115. Different formats and/or different numerologies for MBSFN subframes can be defined and utilized by the access point 105 for the multicast communications. The access point 105 can accordingly, via scheduling component 302, indicate one or more of the MBSFN format for the MBSFN subframes, the numerology for the multicast communications in the MBSFN subframes, scheduling information for the multicast communications, etc. In an example, the UE 115, via the communicating component 361, can receive the information from the access point 105 and/or determine or derive additional information that may not be explicitly signaled, as described further herein. Additionally, the access point 105 may dynamically switch one or more subframes configured for MBSFN communications to unicast communications, and the UE 115 may detect the switching based on one or more parameters received from the access point 105, as described further herein.

Figure 2:
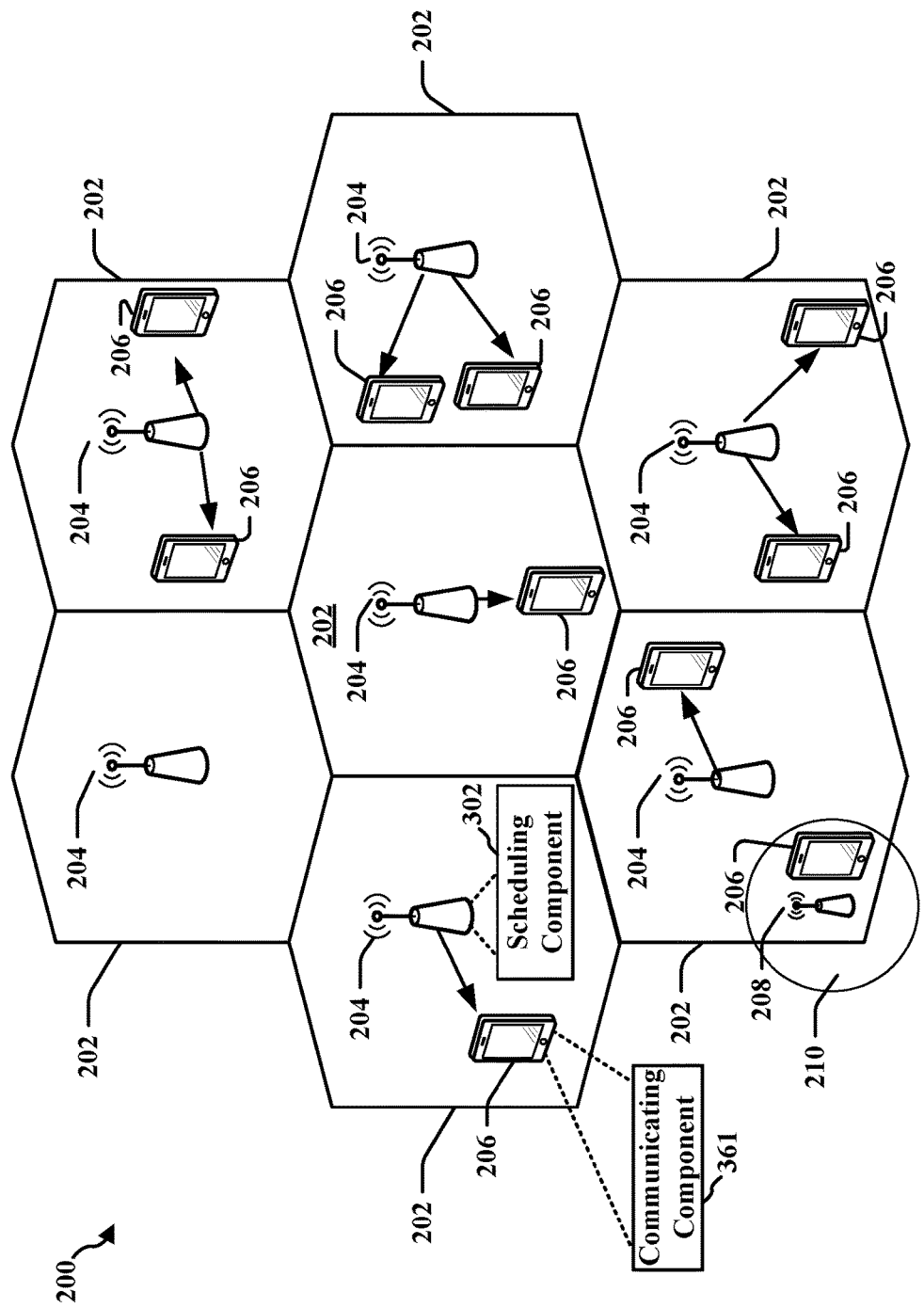
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more small cell eNBs 208 may have cellular regions 210 that overlap with one or more of the cells 202. The small cell eNBs 208 may provide one or more cells of a lower power class, such as a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 and/or small cell eNBs 208 may include a scheduling component 302 configured to indicate one or more parameters related to multicast communications, and/or transmit multicast communications based on the one or more parameters. Similarly, one or more of UEs 206 may include a communicating component 361 configured to obtain the one or more parameters related to multicast communications and/or process multicast communications received based on the one or more parameters. There is no centralized controller in this example of an access network 200, but a centralized controller may be used in alternative configurations. The eNBs 204, 208 are responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204, 208 may have multiple antennas supporting MIMO technology. The use of MIMO technology enables the eNBs 204, 208 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204, 208 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
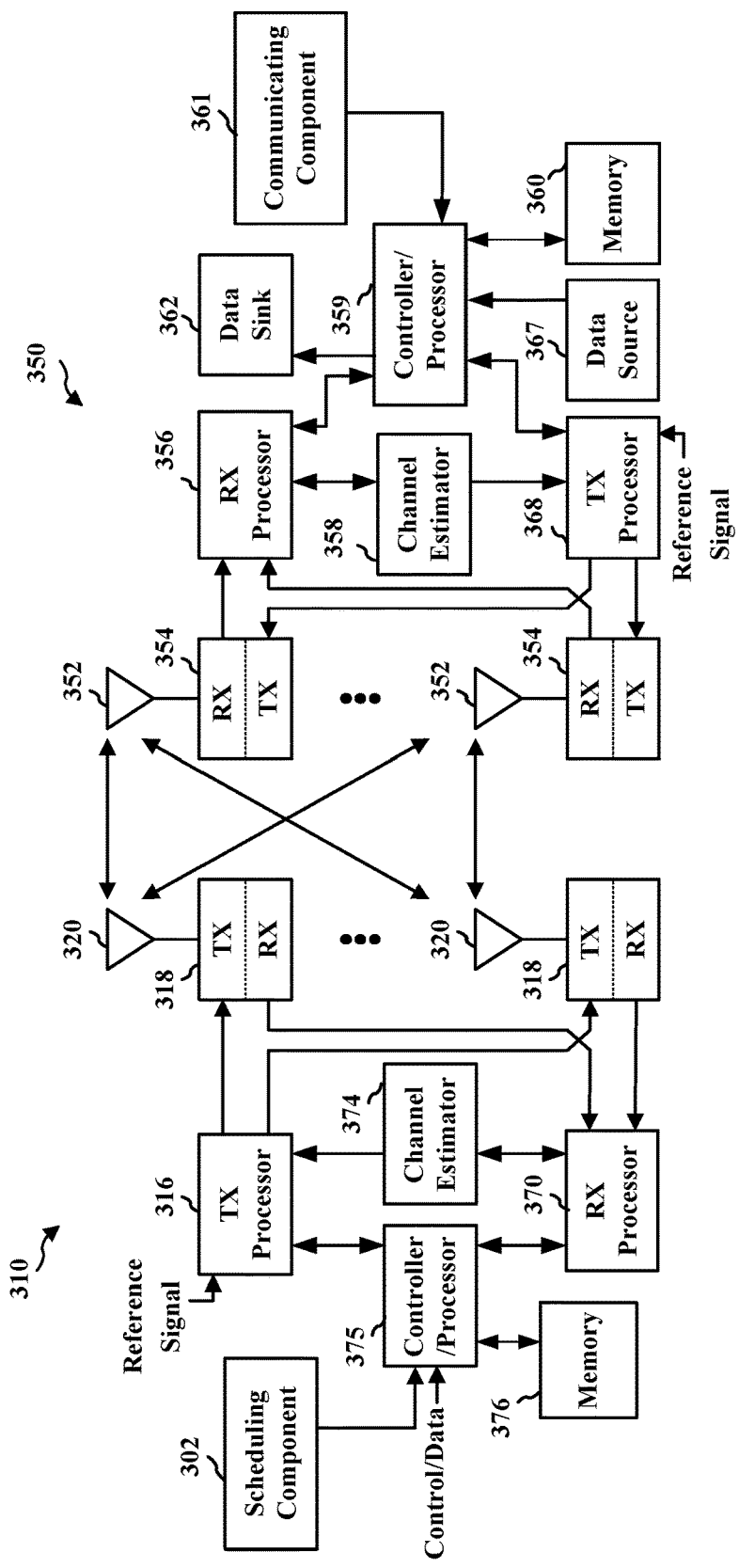
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot signal) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

In addition, eNB 310 may include a scheduling component 302 configured to indicate one or more parameters related to multicast communications, and/or transmit multicast communications based on the one or more parameters. Though scheduling component 302 is shown as coupled with controller/processor 375, substantially any processor of an eNB 310 can provide the functions of the scheduling component 302 and/or its related components described herein (e.g., in conjunction with controller/processor 375, memory 376, or otherwise). For example, TX processor 316 and/or RX processor 370 can additionally or alternatively provide one or more functions of scheduling component 302, as described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In addition, UE 350 may include a communicating component 361 configured to obtain the one or more parameters related to multicast communications and/or process multicast communications received based on the one or more parameters. Though communicating component 361 is shown as coupled with controller/processor 359, substantially any processor of a UE 350 can provide the functions of the communicating component 361 and/or its related components described herein (e.g., in conjunction with controller/processor 359, memory 360, or otherwise). For example, TX processor 368 and/or RX processor 356 can additionally or alternatively provide one or more functions of communicating component 361, as described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
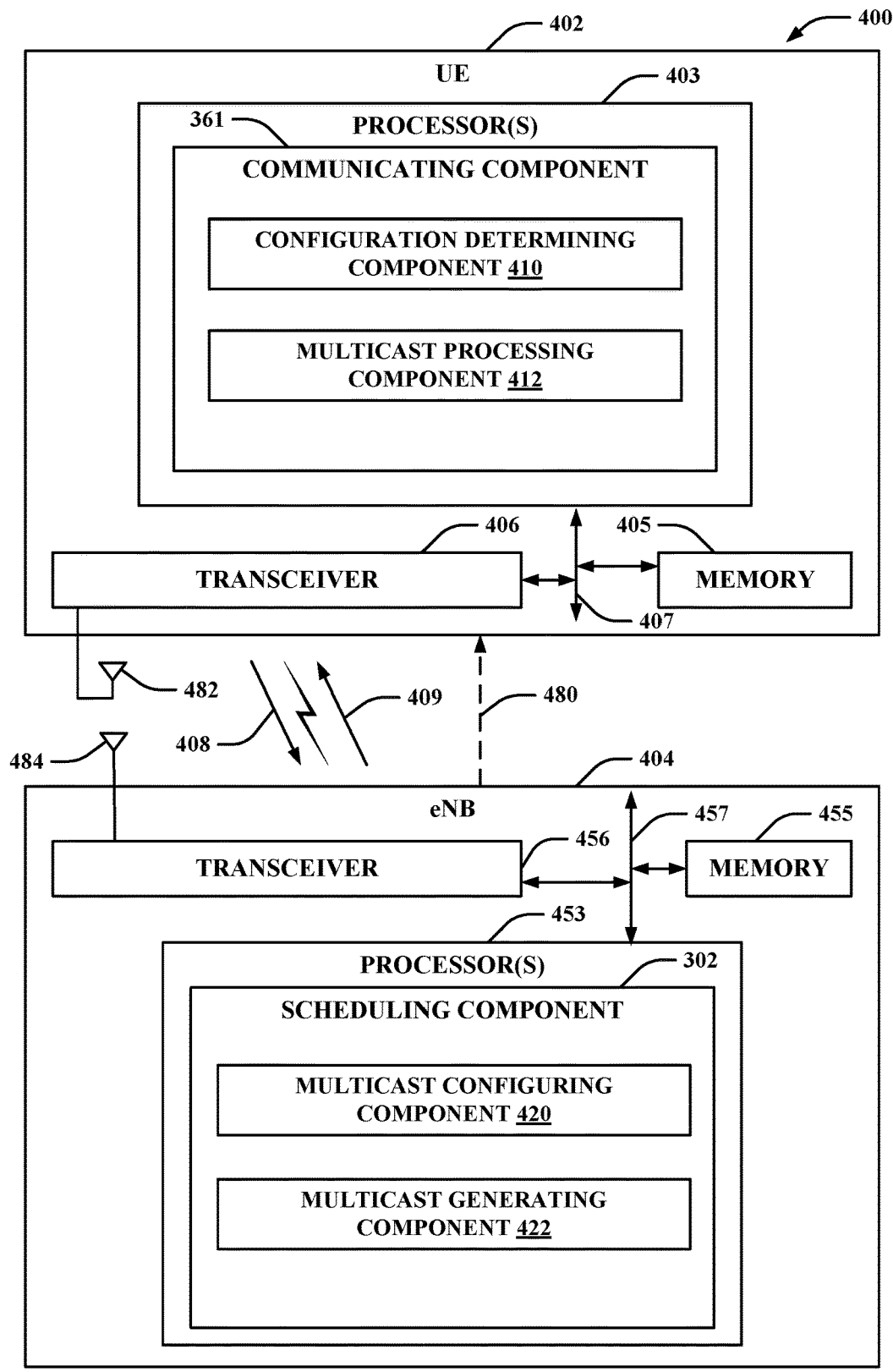
FIG. 4 is a diagram illustrating an example of a system for scheduling multicast communications in accordance with aspects described herein.
Figure 5:
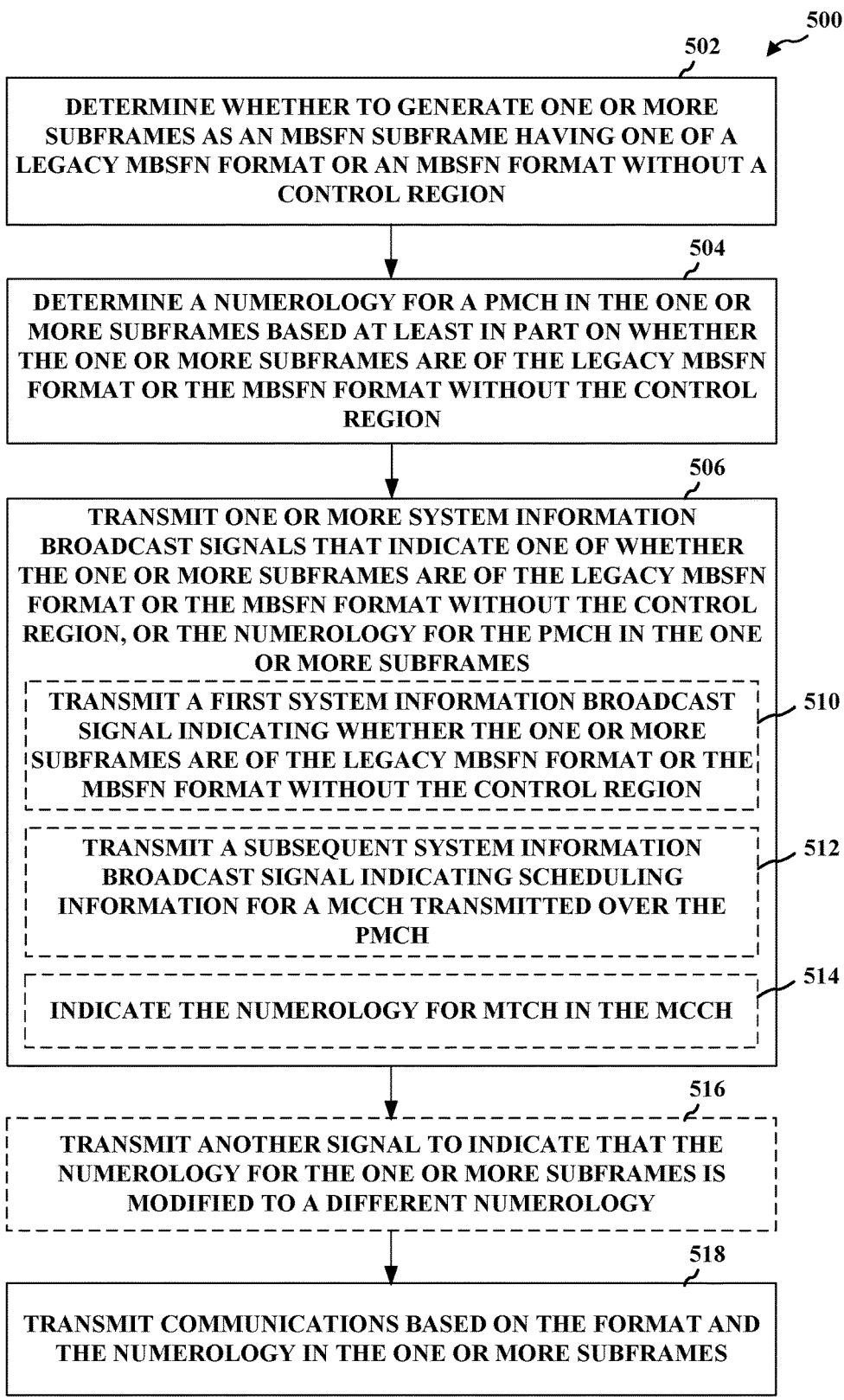
FIG. 5 is a flow chart of an example of a method for scheduling multicast communications in accordance with aspects described herein.
Figure 6:
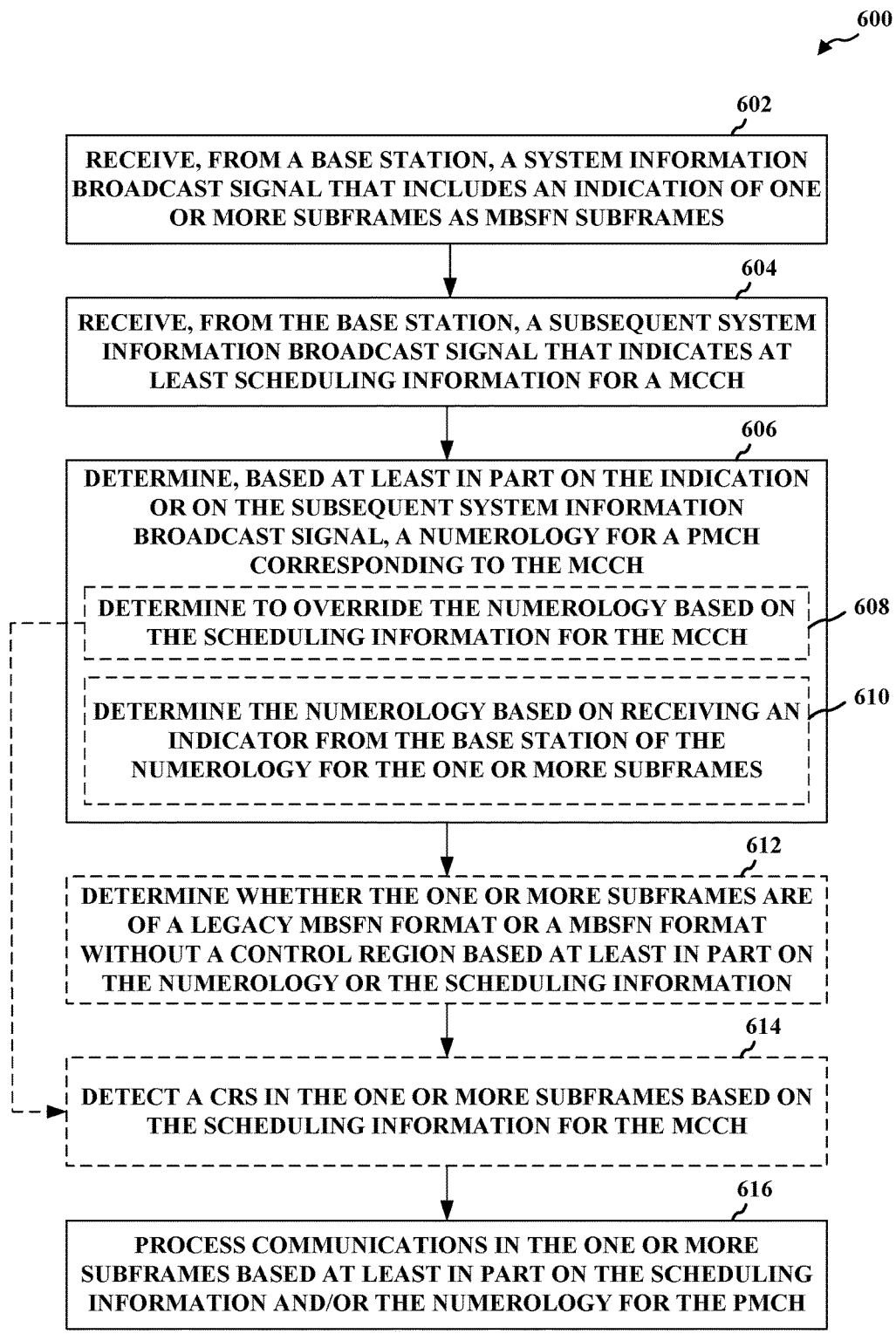
FIG. 6 is a flow chart of an example of a method for configuring and/or processing multicast communications in accordance with aspects described herein.

Referring to FIGS. 4-6, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 5-6 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 4 illustrates an example of a system 400 for scheduling and processing multicast communications. System 400 includes a UE 402 that communicates with an eNB 404 to access a wireless network, examples of which are described in FIGS. 1-3 (e.g., access points 105, eNB 204, small cell eNB 208, eNB 310, UEs 115, 206, 350, etc.), above. In an aspect, eNB 404 and UE 402 may establish one or more downlink channels over which to communicate via downlink signals 409, which can be transmitted by eNB 404 (e.g., via transceiver 456) and received by UE 402 (e.g., via transceiver 406) for communicating control and/or data messages (e.g., in signaling) from the eNB 404 to the UE 402 over configured communication resources, as described further herein. Moreover, for example, eNB 404 and UE 402 may establish one or more uplink channels over which to communicate via uplink signals 408, which can be transmitted by UE 402 (e.g., via transceiver 406) and received by eNB 404 (e.g., via transceiver 456) for communicating control and/or data messages (e.g., in signaling) from the UE 402 to the eNB 404 over configured communication resources, as described herein. For example, eNB 404 may broadcast one or more system information broadcast signals 480 that can indicate whether a subframe is configured for multicast communications, scheduling information for multicast communications, a numerology for multicast communications, and/or the like. UE 402 can obtain the information regarding the multicast communications and can accordingly process multicast communications received in the one or more subframes based on the information and/or additional information derived from the information, as described further herein.

In a specific example, non-backward compatible component carriers (CC) are defined for MBMS/evolved MBMS (eMBMS) where the CCs can have all subframes set as MBSFN subframes, multiple possible numerologies, and/or can refrain from utilizing a control region. For example, the non-backward compatible CCs may include different numerologies associated with longer cyclic prefix (CP) values (e.g., 100 microseconds for two OFDM symbols per subframe, 200 microseconds for one OFDM symbol per subframe, etc.), where the different numerologies may not comply with numerologies for legacy or current CCs. Additionally, in an example, where the MBSFN subframe has a control region, it can support PMCH with a legacy numerology (e.g. extended CP with 15 kHz subcarrier spacing) and/or physical downlink shared channel (PDSCH), physical downlink control channel (PDCCH) and enhanced PDCCH (EPDCCH) communications. In this example, where the MBSFN subframe does not have the control region, it can support PMCH with a different numerology (e.g., for a longer CP). In LTE, for example, SIB2 can be used to signal which subframes are MBSFN subframes, and MCCH can signal which subframes are used for multicast traffic channel (MTCH) transmissions. SIB13 in LTE can indicate MCCH scheduling information, which can give further configurations for each MTCH. In addition, if unicast is supported in a radio frame, at least subframes at indices 0 and 5 can be non-MBSFN (e.g., unicast) subframes.

In an example, to determine the type or format of an MBSFN subframe (e.g., a legacy MBSFN format with a control region or a different MBSFN format without a control region) and/or whether the MBSFN subframe carries PMCH or PDSCH, UE 402 can perform blind detection on signals received from the eNB 404 to determine whether a common reference signal (CRS) is detected in a first OFDM symbol. If so, for example, the UE 402 can determine the MBSFN subframe is of the legacy MBSFN format and can perform processing based on the legacy numerology (e.g., for normal CP). If the UE 402 does not detect the CRS, for example, it can determine the MBSFN subframe is of a different MBSFN format and can perform processing based on a different numerology (e.g., for longer CP). In other examples, eNB 404 can broadcast system information broadcast signals 480 to the UE 402 that indicate a MBSFN format, scheduling information, and/or numerology associated with the one or more subframes, as described further herein. This can conserve processing time otherwise used by the UE 402 in attempting to blind detect the CRS, in one example.

In an aspect, the UE 402 may include one or more processors 403 and/or a memory 405 that may be communicatively coupled, e.g., via one or more buses 407, and may operate in conjunction with or otherwise implement a communicating component 361 for obtaining the one or more parameters related to multicast communications and/or processing multicast communications received based on the one or more parameters. For example, the various operations related to the communicating component 361 may be implemented or otherwise executed by the one or more processors 403 and, in an aspect, can be executed by a single processor, while in other aspects, different ones of the operations may be executed by a combination of two or more different processors. For example, in an aspect, the one or more processors 403 may include any one or any combination of a modem processor, or a baseband processor, or a digital signal processor, or an application specific integrated circuit (ASIC), or a transmit processor, receive processor, or a transceiver processor associated with a transceiver 406. Further, for example, the memory 405 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or the one or more processors 403. Moreover, memory 405 or computer-readable storage medium may be resident in the one or more processors 403, external to the one or more processors 403, distributed across multiple entities including the one or more processors 403, etc.

In particular, the one or more processors 403 and/or memory 405 may execute actions or operations defined by communicating component 361 or its subcomponents. For instance, the one or more processors 403 and/or memory 405 may execute actions or operations defined by a configuration determining component 410 for determining one or more parameters related to a configuration for multicast communications based one or more signals broadcasted by an eNB. In an aspect, for example, the configuration determining component 410 may include hardware (e.g., one or more processor modules of the one or more processors 403) and/or computer-readable code or instructions stored in memory 405 and executable by at least one of the one or more processors 403 to perform the specially configured configuration determining operations described herein. Further, for instance, the one or more processors 403 and/or memory 405 may execute actions or operations defined by a multicast processing component 412 for processing multicast communications based at least in part on the one or more parameters determined by the configuration determining component 410. In an aspect, for example, the multicast processing component 412 may include hardware (e.g., one or more processor modules of the one or more processors 403) and/or computer-readable code or instructions stored in memory 405 and executable by at least one of the one or more processors 403 to perform the specially configured multicast processing operations described herein.

Similarly, in an aspect, the eNB 404 may include one or more processors 453 and/or a memory 455 that may be communicatively coupled, e.g., via one or more buses 457, and may operate in conjunction with or otherwise implement a scheduling component 302 for indicating one or more parameters related to multicast communications, and/or transmitting multicast communications based on the one or more parameters. For example, the various functions related to scheduling component 302 may be implemented or otherwise executed by one or more processors 453 and, in an aspect, can be executed by a single processor, while in other aspects, different ones of the functions may be executed by a combination of two or more different processors, as described above. In one example, the one or more processors 453 and/or memory 455 may be configured as described in examples above with respect to the one or more processors 403 and/or memory 405 of the UE 402.

In an example, the one or more processors 453 and/or memory 455 may execute actions or operations defined by the scheduling component 302 or its subcomponents. For instance, the one or more processors 453 and/or memory 455 may execute actions or operations defined by a multicast configuring component 420 for broadcasting one or more system information signals specifying one or more parameters related to configuration of multicast communications. In an aspect, for example, the multicast configuring component 420 may include hardware (e.g., one or more processor modules of the one or more processors 453) and/or computer-readable code or instructions stored in memory 455 and executable by at least one of the one or more processors 453 to perform the specially configured multicast configuring operations described herein. Further, for instance, the one or more processors 453 and/or memory 455 may execute actions or operations defined by a multicast generating component 422 for generating multicast communications according to the one or more parameters configured by the multicast configuring component 420. In an aspect, for example, the multicast generating component 422 may include hardware (e.g., one or more processor modules of the one or more processors 453) and/or computer-readable code or instructions stored in memory 455 and executable by at least one of the one or more processors 453 to perform the specially configured multicast generating operations described herein.

In an example, transceivers 406, 456 may be configured to transmit and receive wireless signals through one or more antennas 482, 484 and may generate or process the signals using one or more RF front end components (e.g., power amplifiers, low noise amplifiers, filters, analog-to-digital converters, digital-to-analog converters, etc.), one or more transmitters, one or more receivers, etc. In an aspect, transceivers 406, 456 may be tuned to operate at specified frequencies such that UE 402 and/or eNB 404 can communicate at a certain frequency. In an aspect, the one or more processors 403 may configure transceiver 406 and/or one or more processors 453 may configure transceiver 456 to operate at a specified frequency and power level based on a configuration, a communication protocol, etc. to communicate uplink signals 408 and/or downlink signals 409, respectively, over related uplink or downlink communication channels.

In an aspect, the transceivers 406, 456 can operate in multiple bands (e.g., using a multiband-multimode modem, not shown) such to process digital data sent and received using transceivers 406, 456. In an aspect, the transceivers 406, 456 can be multiband and be configured to support multiple frequency bands for a specific communications protocol. In an aspect, the transceivers 406, 456 can be configured to support multiple operating networks and communications protocols. Thus, for example, the transceivers 406, 456 may enable transmission and/or reception of signals based on a specified modem configuration.

FIG. 5 illustrates an example of a method 500 for transmitting (e.g., by an eNB) system information signals related to configuring multicast communications and/or transmitting the multicast communications. In method 500, blocks indicated as dashed boxes represent optional steps.

At Block 502, the eNB may determine whether to generate one or more subframes as an MBSFN subframe having one of a legacy MBSFN format or an MBSFN format without a control region. In an aspect, the multicast configuring component 420, e.g., in conjunction with processor(s) 453, memory 455, and/or transceiver 456, can determine whether to generate the one or more subframes as an MBSFN subframe having one of a legacy MBSFN format or an MBSFN format without a control region. For example, the multicast configuring component 420 can determine the MBSFN format for the one or more subframes based on at least one of a size of a payload to be broadcast over an associated PMCH, MTCH, etc., a quality-of-service (QoS) associated with a flow corresponding to the MBSFN communications, a bandwidth available at the eNB 404 for transmitting the MBSFN communications, a capability of one or more UEs to process an MBSFN format without a control region, whether the multicast communications are to include PMCH or PDSCH, etc. Moreover, in one example, the multicast configuring component 420 can determine one or more subframes (e.g., subframes 0 and 5) to be non-MBSFN subframes where unicast is to be supported and/or where at least one UE (e.g., UE 402) is scheduled for communications with the eNB 404.

At Block 504, the eNB may determine a numerology for a PMCH in the one or more subframes based at least in part on whether the one or more subframes are of the legacy MBSFN format or the MBSFN format without the control region. In an aspect, the multicast configuring component 420, e.g., in conjunction with the processor(s) 453, memory 455, and/or transceiver 456, can determine the numerology for the PMCH in the one or more subframes based at least in part on whether the one or more subframes are of the legacy MBSFN format or the MBSFN format without the control region. For example, as described, the numerology can relate to a CP value, subcarrier spacing, etc., and determining the numerology for the PMCH may comprise determining the CP value for the PMCH, the subcarrier spacing for the PMCH, other parameters that can be in the numerology, etc. In addition, for example, the multicast configuring component 420 may determine the numerology based at least in part on whether the service to be received (e.g., the MBMS) is for a deployment with large intersite distance (ISD) (e.g., having a distance that achieves a threshold), a deployment with rooftop antenna reception, a deployment intended for mobile devices, etc.

At Block 506, the eNB may transmit one or more system information broadcast signals that indicate one of whether the one or more subframes are of the legacy MBSFN format or the MBSFN format without the control region, or the numerology for the PMCH in the one or more subframes. In an aspect, the multicast configuring component 420, e.g., in conjunction with the processor(s) 453, memory 455, and/or transceiver 456, can transmit the one or more system information broadcast signals 480 that indicate one of whether the one or more subframes are of the legacy MBSFN format or the MBSFN format without the control region, or the numerology for the PMCH in the one or more subframes.

In one example, in transmitting the one or more system information broadcast signals at Block 506, the eNB may optionally, at Block 510, transmit a first system information broadcast signal indicating whether the one or more subframes are of the legacy MBSFN format or the MBSFN format without the control region. In an aspect, the multicast configuring component 420, e.g., in conjunction with the processor(s) 453, memory 455, and/or transceiver 456, can transmit the first system information broadcast signal indicating whether the one or more subframes are of the legacy MBSFN format or the MBSFN format without the control region. In a specific example, the first system information broadcast signal may correspond to SIB2 defined in LTE, which may include an indication (e.g., one or more parameters) of whether the one or more subframes are of a normal (non-MBSFN) format, a legacy MBSFN format (e.g., including a control region), or a different MBSFN format (e.g., a MBSFN format not including a control region). Thus, as described further herein, the UE 402 can determine whether the one or more subframes are MBSFN subframes and the MBSFN format for the one or more subframes based on the SIB2 transmission by the eNB 404.

In addition, in this example, in transmitting the one or more system information broadcast signals at Block 506, the eNB may optionally, at Block 512, transmit a subsequent system information broadcast signal indicating scheduling information for a MCCH transmitted over the PMCH. In an aspect, the multicast configuring component 420, e.g., in conjunction with the processor(s) 453, memory 455, and/or transceiver 456, can transmit the subsequent system information broadcast signal indicating scheduling information for the MCCH transmitted over the PMCH. In this example, as described further herein, the UE 402 may derive the numerology for the PMCH based at least in part on detecting the MCCH scheduling information (e.g., and thus the MBSFN subframe includes PMCH) and determining whether the one or more subframes are of the legacy MBSFN format (e.g., which can correlate to a legacy numerology for PMCH) or of the different MBSFN format (e.g., which can correlate to a different numerology having longer CP for PMCH). For example, the UE 402 may derive the numerology as including a CP value, a subcarrier spacing, etc.

In addition, in this example, in transmitting the one or more system information broadcast signals at Block 506, the eNB may optionally, at Block 514, indicate the numerology for MTCH in the MCCH. In an aspect, the multicast generating component 422, e.g., in conjunction with the processor(s) 453, memory 455, and/or transceiver 456, can indicate the numerology for MTCH in the MCCH. In one example, multicast generating component 422 may indicate the numerology by using the numerology in generating multicast communications for transmission to the UE 402 (e.g., according to a CP value, subcarrier spacing, etc. corresponding to the determined MBSFN format. In another example, the multicast generating component 422 can override the numerology associated with the MBSFN format indicated in SIB2 to effectively dynamically transform the MBSFN subframe to a unicast subframe. For example, in this regard, the multicast generating component 422 can generate the MCCH to indicate whether MTCH is included in the MCCH in the subframe. For example, where SIB2 indicates a subframe is of the different MBSFN format and MTCH is indicated as included in the MCCH, this can indicate the different numerology is used for the different MBSFN format for MBSFN communications. However, where SIB2 indicates a subframe is of an MBSFN format (e.g., the different MBSFN format and/or the legacy MBSFN format) and MTCH is indicated as not included in the MCCH, this can indicate that MBSFN is not transmitted in the subframe, and that the subframe may be used for unicast communications, as described further herein.

In another example, in transmitting the one or more system information broadcast signals, the eNB 404 can indicate (e.g., in the first system information broadcast signal) whether communications over one or more radio frames are blanked without transmitting CRS. In yet another example, the eNB 404 can indicate one or more radio frames over which a UE can be scheduled, and/or can accordingly communicate a mask of subframes formatted for non-MB-SFN or MBSFN based on whether a UE can be scheduled in the radio frame (e.g., subframes 0 and 5 in such radio frames may be non-MBSFN format, and the remaining subframes and all subframes where a UE is not scheduled can be MBSFN format).

In yet another example, the eNB may optionally, at Block 516, transmit another signal to indicate that the numerology for the one or more subframes is modified to a different numerology. In an aspect, the scheduling component 302, e.g., in conjunction with the processor(s) 453, memory 455, and/or transceiver 456, can transmit the signal to indicate that the numerology for the one or more subframes is modified to a different numerology. For example, the signal may be a radio resource control (RRC) layer, or other higher layer, signal that can be received by a UE 402 and used to determine the numerology.

In another example, the multicast configuring component 420 can transmit the first system information broadcast signal (e.g., 2) indicating whether the one or more subframes are of a normal (non-MBSFN) format or an MBSFN format (e.g., but not necessarily whether the MBSFN format is a legacy MBSFN format or a different MBSFN format (e.g., not including a control region)). In addition, in this example, the multicast configuring component 420 can transmit the subsequent system information broadcast signal (e.g., SIB13) including PMCH information, which can include both scheduling information for an MCCH and a numerology for the PMCH. In this example, as described further herein, where the subsequent system information broadcast signal indicates PMCH information for the one or more subframes, the UE 402 may derive the MBSFN format for the one or more subframes (e.g., whether the one or more subframes correspond to the legacy MBSFN format or the different MBSFN format without a control region) based at least in part on whether the indicated numerology is a legacy numerology (e.g., which can correlate to a legacy MBSFN format) or a different numerology (e.g., which can correlate to a different MBSFN format without a control region).

This may allow for dynamic allocation of subframes as being of different MBSFN formats as the MCCH information can indicate the numerology for a given subframe, from which the MBSFN format can be determined. In this example, where MCCH indicates that a subframe is transmitted using a legacy numerology for PMCH, this may indicate a legacy MBSFN format. Where MCCH indicates that a subframe is transmitted using a different numerology for PMCH, this may indicate a different MBSFN format (e.g., the different MBFSN format that does not include a control region). Where MCCH does not signal the subframe as used for MTCH, this may indicate a legacy MBSFN format, and blind detection of CRS in the first OFDM symbol(s) may be performed to determine whether the MBSFN subframe was dynamically overridden to a unicast subframe (e.g., where a CRS is detected) or otherwise includes a CRS.

In any case, at Block 518, the eNB can transmit communications based on the format and the numerology in the one or more subframes. In an aspect, the scheduling component 302, e.g., in conjunction with the processor(s) 453, memory 455, and/or transceiver 456, can transmit the communications (e.g., MBSFN or unicast) based on the format and the numerology in the one or more subframes. For example, the scheduling component 302 can transmit the communications in one or more broadcast or unicast signals based on the one or more parameters transmitted in the one or more system information broadcast signals, overriding of parameters by MCCH information, etc., as described above. As described further herein, the UE 402 can obtain the parameters and accordingly receive and process communications transmitted at Block 518.

FIG. 6 illustrates an example of a method 600 for receiving (e.g., by a UE) system information signals related to configuring multicast communications and/or processing the multicast communications. In method 600, blocks indicated as dashed boxes represent optional steps.

At Block 602, the UE may receive, from a base station, a system information broadcast signal that includes an indication of one or more subframes as MBSFN subframes. In an aspect, the configuration determining component 410, e.g., in conjunction with the processor(s) 403, memory 405, and/or transceiver 406, can receive, from the base station (e.g., eNB 404), the system information broadcast signal 480 that includes an indication of one or more subframes as MBSFN subframes. In some examples, the system information broadcast signal may be SIB2, and may either indicate whether the one or more subframes are MBSFN subframes or non-MBSFN subframes, or may indicate a format of the one or more subframes (e.g., a non-MBSFN format, a legacy MBSFN format, a different MBSFN format without a control region, etc.). Thus, the configuration determining component 410 may determine whether one or more subframes are MBSFN subframes and/or an MBSFN format (or non-MBSFN format) for the one or more subframes based on a SIB2 transmission from the eNB 404.

At Block 604, the UE may receive, from the base station, a subsequent system information broadcast signal that indicates at least scheduling information for a MCCH. In an aspect, the configuration determining component 410, e.g., in conjunction with the processor(s) 403, memory 405, and/or transceiver 406, can receive, from the base station, the subsequent system information broadcast signal 480 that indicates at least the scheduling information for the MCCH. For example, the scheduling information can indicate that the MBSFN subframe is configured for PMCH, and this information can be used with the format of the MBSFN subframe received in SIB2 to derive a numerology for PMCH. In another example, the scheduling information (and/or other information in the subsequent system information broadcast signal) can indicate, and/or can otherwise be used for determining, the numerology for PMCH. For example, the MBSFN format for the one or more subframes can be determined based on determining the one or more subframes are MBSFN subframes and the indicated numerology for PMCH. In one example, as described further herein, where the PMCH is not scheduled, this may indicate the corresponding MBSFN subframe is of the legacy MBSFN format and/or may indicate to blindly detect a CRS in the subframe.

At Block 606, the UE may determine, based at least in part on the indication or on the subsequent system information broadcast signal, a numerology for a PMCH corresponding to the MCCH. In an aspect, the configuration determining component 410, e.g., in conjunction with the processor(s) 403, memory 405, and/or transceiver 406, can determine, based at least in part on the indication or on the subsequent system information broadcast signal, the numerology for the PMCH corresponding to the MCCH.

For example, the configuration determining component 410 may determine, based on the indication, a MBSFN format for the one or more subframes where SIB2 includes the indication of the MBSFN format (e.g., as non-MBSFN format, legacy MBSFN format, or different MBSFN format without a control region). As described, for example, this may be a parameter value that indicates one of these three formats, though additional and/or different combinations of formats may be possible in other examples. In this example, the configuration determining component 410 may also determine, based on the scheduling information in the subsequent system information broadcast signal (e.g., SIB13) that the MBSFN subframe includes PMCH (e.g., as opposed to PDSCH). The configuration determining component 410 can accordingly determine the numerology as a legacy numerology (e.g., where the MBSFN format is a legacy MBSFN format) or a different numerology (e.g., where the MBSCH format is a different MBSFN format) for the PMCH.

In addition, in this example, the one or more subframes may be overridden to be a unicast subframe (e.g., where a multicast service at the eNB 404 does not need to transmit a multicast subframe). In this example, in determining the numerology at Block 606, the UE may optionally, at Block 608, determine to override the numerology based on the scheduling information for the MCCH. In an aspect, the configuration determining component 410, e.g., in conjunction with the processor(s) 403, memory 405, and/or transceiver 406, can determine to override the numerology based on the scheduling information for the MCCH. As described, the eNB 404 may utilize the MCCH to indicate whether MTCH is present in the subframe, and this indication, e.g., along with a determined MBSFN format of the subframe, can be used to determine whether the MBSFN configured subframe is used for unicast communications. For example, where the configuration determining component 410 determines, based on MCCH scheduling information, that the MCCH carries MTCH in the subframe indicated as being of a different MBSFN format without a control region, the configuration determining component 410 can accordingly determine that the MBSFN subframe is used for MBSFN communications according to the different MBSFN format. Where the configuration determining component 410 determines, based on MCCH scheduling information, that the MCCH does not carry MTCH in the subframe indicated as being of a different MBSFN format without a control region, configuration determining component 410 can accordingly determine that the MBSFN subframe is used for unicast communications and can override the numerology.

Moreover, in this example, where the configuration determining component 410 determines to override the numerology, the UE may optionally, at Block 614, detect a CRS in the one or more subframes based on the scheduling information for the MCCH. In an aspect, the communicating component 361, e.g., in conjunction with the processor(s) 403, memory 405, and/or transceiver 406, can detect a CRS in the one or more subframes (e.g., in the first subframe) based on the scheduling information for the MCCH, e.g., as the configuration determining component 410 determined the subframe as configured for unicast communications. In addition, the communicating component 361 can monitor for PDCCH in the one or more subframes depending on the CRS detection outcome.

In another example, in determining the numerology at Block 606, the UE may optionally, at Block 610, determine the numerology based on receiving an indicator from the base station of the numerology for the one or more subframes. In an aspect, the configuration determining component 410, e.g., in conjunction with the processor(s) 403, memory 405, and/or transceiver 406, can determine the numerology based on receiving an indicator from the base station of the numerology for the one or more subframes. As described, for example, the eNB 404 may indicate the numerology in higher layer signaling (e.g., RRC signaling) to the UE 402.

In another example, where the UE determines the numerology based on the subsequent system information broadcast signal at Block 606, the UE may optionally, at Block 612, determine whether the one or more subframes are of a legacy MBSFN format or a MBSFN format without a control region based at least in part on the numerology or the scheduling information. In an aspect, the configuration determining component 410, e.g., in conjunction with the processor(s) 403, memory 405, and/or transceiver 406, can determine whether the one or more subframes are of the legacy MBSFN format or the MBSFN format without a control region based at least in part on the numerology or the scheduling information. For example, the configuration determining component 410 may determine that the first system information broadcast signal (e.g., SIB2) indicates the one or more subframes as MBSFN subframes (though may not indicate a MBSFN format for the one or more subframes), and may determine the numerology for PMCH based on MCCH scheduling information received in the subsequent system information broadcast signal (e.g., SIB13), which may explicitly indicate the numerology as a parameter in the MCCH scheduling information. Accordingly, the configuration determining component 410 may determine that one or more subframes to be of the legacy MBSFN format where the one or more subframes are indicated as MBSFN subframes and where the MCCH scheduling information indicates a legacy numerology for PMCH. Similarly, for example, the configuration determining component 410 may determine that one or more subframes to be of the different MBSFN format (a format without a control region) where the one or more subframes are indicated as MBSFN subframes and where the MCCH scheduling information indicates a different numerology (e.g., a numerology with a longer CP) for PMCH.

In addition, the configuration determining component 410 may determine the one or more subframes to be of a legacy MBSFN format where first system information broadcast signal (e.g., SIB2) indicates that the one or more subframes are MBSFN subframes and where the MBSFN subframes are not signaled by MCCH to include MTCH. At least in this last example, where the configuration determining component 410 may determine the one or more subframes to be of the legacy MBSFN format, the UE may optionally, at Block 614, detect a CRS in the one or more subframes based on the scheduling information for the MCCH, as described above. In an aspect, the multicast processing component 412, e.g., in conjunction with the processor(s) 403, memory 405, and/or transceiver 406, can detect (e.g., perform blind detection for) a CRS in the one or more subframes based on the scheduling information for the MCCH and based on determining the one or more subframes to be of the legacy MBSFN format.

In yet another example, the UE may optionally, at Block 614, detect the CRS in the one or more subframes to determine whether the indication of one or more subframes as MBSFN subframes in the system information broadcast signal is correct (e.g., where the CRS is detected) or whether the one or more subframes in the radio frame are all MBSFN subframes (e.g., where CRS is not detected). In another example, in receiving the system information broadcast signal at Block 602, the UE 402 may also receive an indication of whether the eNB 404 plans to blank some radio frames in an upcoming time interval without transmitting the CRS, and thus whether the one or more subframes are used for any communications at all (e.g., and thus whether to process communications over the one or more subframes). In another example, in receiving the system information broadcast signal at Block 602, the UE may also receive an indication of whether the eNB 404 is scheduling UEs in a radio frame, and may assume that in such radio frames, some subframes are non-MBSFN format (e.g., subframes 0 and 5) and the other subframes, as well as all subframes in radio frames where UEs are not being scheduled, are of an MBSFN format. In an aspect, the configuration determining component 410 can further determine the specific MBSFN format for the determined MBSFN subframes based on a numerology indicated in MCCH information. In an example, the eNB 404 can transmit a mask to the UE 402 (e.g., in the system information broadcast signal, such as SIB2) to indicate the subframe configuration for multiple radio frames as being non-MBSFN or MBSFN.

At Block 616, the UE may process communications in the one or more subframes based at least in part on the scheduling information and/or the numerology for the PMCH. In an aspect, the multicast processing component 412, e.g., in conjunction with the processor(s) 403, memory 405, and/or transceiver 406, can process communications (e.g., unicast or multicast communications) in the one or more subframes based at least in part on the scheduling information and/or the numerology for the PMCH. For example, the multicast processing component 412 can process the communications according to a determined format for the one or more subframes (e.g., non-MBSFN format, legacy MBSFN format, or different MBSFN format without a control region), MCCH scheduling information (e.g., over resources determined for the corresponding MTCH communications), and/or a PMCH numerology (e.g., verifying a CP of a corresponding length, removing the CP to decode data, etc.).

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for determining whether one or more subframes are multicast-broadcast single-frequency network (MBSFN) subframes, comprising:

receiving, by a user equipment (UE) and from a base station, a system information broadcast signal that includes an indication of one or more subframes as MBSFN subframes;

receiving, by the UE and from the base station, a subsequent system information broadcast signal that indicates at least scheduling information for a multicast control channel (MCCH) in at least a portion of the one or more subframes;

determining, by the UE and based at least in part on at least one of the indication or the subsequent system information broadcast signal, a numerology, including a subcarrier spacing, for a physical multicast channel (PMCH) corresponding to the MCCH in at least the portion of the one or more subframes; and processing, by the UE, at least the portion of the one or more subframes based at least in part on the scheduling information and the subcarrier spacing for the PMCH, wherein the indication specifies whether the one or more subframes are of a legacy MBSFN format or a MBSFN format without a control region, and wherein determining the numerology is based at least in part on determining whether the one or more subframes are of the legacy MBSFN format or the MBSFN format without the control region.

2. The method of claim 1, wherein the subsequent system information broadcast signal indicates the numerology for the PMCH.

3. The method of claim 2, further comprising determining whether at least the portion of the one or more subframes are of a legacy MBSFN format or a MBSFN format without a control region based at least in part on the numerology, wherein processing the MCCH is further based on determining whether at least the portion of the one or more subframes are of the legacy MBSFN format or the MBSFN format without the control region.

4. The method of claim 1, further comprising determining whether a subset of the one or more subframes are of a legacy MBSFN format based at least in part on determining whether the MCCH signals the subset of the one or more subframes to be used for multicast traffic channel (MTCH) transmissions.

5. The method of claim 4, further comprising detecting a common reference signal (CRS) in the subset of the one or more subframes based at least in part on determining that the MCCH signals the subset of the one or more subframes to be used for MTCH transmissions.

6. The method of claim 5, further comprising monitoring a physical downlink control channel (PDCCH) in the subset of the one or more subframes based at least in part on detecting the CRS.

7. The method of claim 1, further comprising determining whether a subset of the one or more subframes are MBSFN subframes used for a physical multicast channel (PMCH) based at least in part on detecting a common reference signal (CRS) in the subset of the one or more subframes.

8. The method of claim 1, wherein the system information broadcast signal indicates whether a subset of the one or more subframes are non-MBSFN subframes.

9. The method of claim 1, further comprising determining whether a subset of the one or more subframes are MBSFN subframes based at least in part on receiving an indication of resources scheduled to a UE in at least a portion of the one or more subframes.

10. The method of claim 1, further comprising determining to override the numerology based on the scheduling information for the MCCH in the subsequent system information broadcast signal.

11. An apparatus for determining whether one or more subframes are multicast-broadcast single-frequency network (MBSFN) subframes, comprising:
    a transceiver for communicating one or more wireless signals via one or more antennas;
    a memory configured to store instructions; and
    one or more processors communicatively coupled with the transceiver and the memory, wherein the one or more processors are configured to:
        receive, from a base station, a system information broadcast signal that includes an indication of one or more subframes as MBSFN subframes;
        receive, from the base station, a subsequent system information broadcast signal that indicates at least scheduling information for a multicast control channel (MCCH) in at least a portion of the one or more subframes;
        determine, based at least in part on at least one of the indication or the subsequent system information broadcast signal, a numerology, including a subcarrier spacing, for a physical multicast channel (PMCH) corresponding to the MCCH in at least the portion of the one or more subframes; and
        process at least the portion of the one or more subframes based at least in part on the scheduling information and the subcarrier spacing for the PMCH,
    wherein the indication specifies whether the one or more subframes are of a legacy MBSFN format or a MBSFN format without a control region, and wherein the one or more processors are configured to determine the numerology based at least in part on determining whether the one or more subframes are of the legacy MBSFN format or the MBSFN format without the control region.

12. The apparatus of claim 11, wherein the subsequent system information broadcast signal indicates the numerology for the PMCH.

13. The apparatus of claim 12, wherein the one or more processors are further configured to determine whether at least the portion of the one or more subframes are of a legacy MBSFN format or a MBSFN format without a control region based at least in part on the numerology, wherein the one or more processors are configured to process the MCCH further based on determining whether at least the portion of the one or more subframes are of the legacy MBSFN format or the MBSFN format without the control region.

14. The apparatus of claim 11, wherein the one or more processors are further configured to determine whether a subset of the one or more subframes are of a legacy MBSFN format based at least in part on determining whether the MCCH signals the subset of the one or more subframes to be used for multicast traffic channel (MTCH) transmissions.

15. The apparatus of claim 14, wherein the one or more processors are further configured to detect a common reference signal (CRS) in the subset of the one or more subframes based at least in part on determining that the MCCH signals the subset of the one or more subframes to be used for MTCH transmissions.

16. The apparatus of claim 15, wherein the one or more processors are further configured to monitor a physical downlink control channel (PDCCH) in the subset of the one or more subframes based at least in part on detecting coding the CRS.

17. The apparatus of claim 11, wherein the one or more processors are further configured to determine whether a subset of the one or more subframes are MBSFN subframes used for a physical multicast channel (PMCH) based at least in part on detecting a common reference signal (CRS) in the subset of the one or more subframes.

18. The apparatus of claim 11, wherein the system information broadcast signal indicates whether a subset of the one or more subframes are non-MBSFN subframes.

19. The apparatus of claim 11, wherein the one or more processors are further configured to determine whether a subset of the one or more subframes are MBSFN subframes based at least in part on receiving an indication of resources scheduled to a UE in at least a portion of the one or more subframes.

20. The apparatus of claim 11, wherein the one or more processors are further configured to determine to override the numerology based on the scheduling information for the MCCH in the subsequent system information broadcast signal.

21. A method for indicating whether one or more subframes are multicast-broadcast single-frequency network (MBSFN) subframes, comprising:
    determining to generate one or more subframes as an MBSFN subframe having one of a legacy MBSFN format or a MBSFN format without a control region;
    determining a numerology, including a subcarrier spacing, for a physical multicast channel (PMCH) in the one or more subframes based at least in part on whether the one or more subframes are of the legacy MBSFN format or the MBSFN format without the control region; and
    transmitting, by a base station, one or more system information broadcast signals that indicate one of whether the one or more subframes are of the legacy MBSFN format or the MBSFN format without the control region, or the subcarrier spacing for the PMCH in the one or more subframes,
    wherein the one or more system information broadcast signals indicate whether the one or more subframes are of a legacy MBSFN format or a MBSFN format without a control region to facilitate determining the numerology based at least in part on whether the one or more subframes are of the legacy MBSFN format or the MBSFN format without the control region.

22. The method of claim 21, wherein transmitting the one or more system information broadcast signals comprises transmitting a system information broadcast signal indicating scheduling information for a multicast control channel (MCCH) transmitted over the PMCH.

23. The method of claim 22, further comprising indicating the numerology in the MCCH.

24. The method of claim 22, wherein transmitting the one or more system information broadcast signals further comprises transmitting a first system information broadcast signal indicating whether the one or more subframes are of the legacy MBSFN format or the MBSFN format without the control region.

25. The method of claim 24, further comprising:
transmitting another signal to indicate that the numerology for the one or more subframes is modified to a different numerology.

26. The method of claim 21, further comprising indicating, in the one or more system information broadcast signals, whether a subset of the one or more subframes are non-MBSFN subframes.

27. An apparatus for indicating whether one or more subframes are multicast-broadcast single-frequency network (MBSFN) subframes, comprising:
a transceiver for communicating one or more wireless signals via one or more antennas;
a memory configured to store instructions; and
one or more processors communicatively coupled with the transceiver and the memory, wherein the one or more processors are configured to:
determine to generate one or more subframes as an MBSFN subframe having one of a legacy MBSFN format or a MBSFN format without a control region;
determine a numerology, including a subcarrier spacing, for a physical multicast channel (PMCH) in the one or more subframes based at least in part on whether the one or more subframes are of the legacy MBSFN format or the MBSFN format without the control region; and
transmit one or more system information broadcast signals that indicate one of whether the one or more subframes are of the legacy MBSFN format or the MBSFN format without the control region, or the subcarrier spacing for the PMCH in the one or more subframes,
wherein the one or more system information broadcast signals indicate whether the one or more subframes are of a legacy MBSFN format or a MBSFN format without a control region to facilitate determining the numerology based at least in part on whether the one or more subframes are of the legacy MBSFN format or the MBSFN format without the control region.

28. The apparatus of claim 27, wherein the one or more processors are configured to transmit the one or more system information broadcast signals at least in part by transmitting a system information broadcast signal indicating scheduling information for a multicast control channel (MCCH) transmitted over the PMCH.

* * * * *